(12) United States Patent
Baker et al.

(10) Patent No.: US 11,762,971 B1
(45) Date of Patent: Sep. 19, 2023

(54) DUAL WEARABLE DEVICE METHOD AND SYSTEM FOR AUTHENTICATING FINANCIAL TRANSACTIONS

(71) Applicant: UIPCO, LLC, San Antonio, TX (US)

(72) Inventors: Kelly Q. Baker, San Antonio, TX (US); William Preston Culbertson, II, Plant City, FL (US); Will Kerns Maney, Jr., San Antonio, TX (US); Gregory David Hansen, San Antonio, TX (US); Jerry John Maestas, Trophy Club, TX (US); Oscar Guerra, San Antonio, TX (US); Gregory Brian Meyer, San Antonio, TX (US); Ana Maldonado, San Antonio, TX (US); Michelle Susan Croak, Chicago, IL (US); Andre Rene Buentello, San Antonio, TX (US); Stacy Callaway Huggar, San Antonio, TX (US); Jose L. Romero, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 436 days.

(21) Appl. No.: 17/006,146

(22) Filed: Aug. 28, 2020

Related U.S. Application Data

(60) Provisional application No. 62/908,294, filed on Sep. 30, 2019.

(51) Int. Cl.
*G06F 21/35* (2013.01)
*G06F 21/32* (2013.01)
(Continued)

(52) U.S. Cl.
CPC .............. *G06F 21/35* (2013.01); *G06F 1/163* (2013.01); *G06F 21/32* (2013.01); *G06Q 20/321* (2020.05);
(Continued)

(58) Field of Classification Search
None
See application file for complete search history.

(56) References Cited

U.S. PATENT DOCUMENTS

2022/0019993 A1\* 1/2022 Rezayee .......... G06K 19/07762

\* cited by examiner

*Primary Examiner* — Namrata Boveja
*Assistant Examiner* — Amit Patel
(74) *Attorney, Agent, or Firm* — Plumsea Law Group, LLC (57) ABSTRACT

A dual wearable smart device system and a method of using the dual wearable smart device system for authenticating an electronic financial transaction are described. In one embodiment, a method for approving an electronic financial transaction using at least two wearable smart devices includes providing a first wearable smart device that is designated as a payment device for conducting electronic financial transactions. The method also includes providing a second wearable smart device that is designated as a confirmation device for confirming the electronic financial transactions by the first wearable smart device. The method includes initiating, by the first wearable smart device, an electronic financial transaction, and, approving, by the second wearable smart device, the electronic financial transaction initiated by the first wearable smart device. The method further includes authenticating the first wearable smart device to complete the electronic financial transaction.

20 Claims, 7 Drawing Sheets

(51) Int. Cl.
*G06F 1/16* (2006.01)
*G06Q 20/32* (2012.01)
*G06Q 20/40* (2012.01)
(52) U.S. Cl.
CPC ... *G06Q 20/3278* (2013.01); *G06Q 20/40145* (2013.01)

DUAL WEARABLE DEVICE METHOD AND SYSTEM FOR AUTHENTICATING FINANCIAL TRANSACTIONS

CROSS-REFERENCE TO RELATED APPLICATION

This application claims the benefit of U.S. Provisional Patent Application Ser. No. 62/908,294 filed on Sep. 30, 2019 and titled "Dual Wearable Device Method and System for Authenticating Financial Transactions", the disclosure of which is incorporated by reference in its entirety.

BACKGROUND

The present embodiments related to electronic financial transactions in general, and more particularly, to methods and systems for authenticating a user for electronic financial transactions.

Electronic payments are moving away from conventional magnetic stripe cards, such as credit cards or debit cards, to a variety of different contactless or near-field-communication (NFC) enabled devices. These contactless or NFC-enabled devices use short distance communications between the NFC-enabled device and a point-of-sale (POS) terminal or other similar payment receiving device that are physically separated to authenticate an electronic financial transaction. However, the availability of personal and financial information on these NFC-enabled devices makes them a target for being stolen or hacked, allowing a criminal to make purchases that are charged to the owner of the stolen or hacked device.

Accordingly, many NFC-enabled device owners may be hesitant to use their device to its fullest capabilities. Additionally, some merchants may be reluctant to accept these types of electronic financial transactions out of concerns that they may not be legitimate. There is a need in the art for a system and method that addresses these shortcomings discussed above.

SUMMARY

In one aspect, a method for approving an electronic financial transaction using at least two wearable smart devices is provided. The method includes providing a first wearable smart device that is designated as a payment device for conducting electronic financial transactions. The method also includes providing a second wearable smart device that is designated as a confirmation device for confirming the electronic financial transactions by the first wearable smart device. The method includes initiating, by the first wearable smart device, an electronic financial transaction, and, approving, by the second wearable smart device, the electronic financial transaction initiated by the first wearable smart device. The method further includes authenticating the first wearable smart device to complete the electronic financial transaction.

In another aspect, a method for conducting an electronic financial transaction using a dual wearable device system is provided. The method includes selecting a first wearable smart device from a plurality of wearable smart devices as a payment device and selecting a second wearable smart device from the plurality of wearable smart device as a confirmation device. The second wearable smart device is different from the first wearable smart device. The method also includes authenticating, by the second wearable smart device, the first wearable smart device for conducting an electronic financial transaction. The method further includes using the first wearable smart device to conduct the electronic financial transaction, where the first wearable smart device is de-authenticated upon completion of the electronic financial transaction.

In another aspect, a dual wearable device system for conducting an electronic financial transaction is provided. The system includes a first wearable smart device including a short-range communication sensor and at least one of a near-field communication (NFC) sensor or a radio frequency identification (RFID) sensor. The system also includes a second wearable smart device including at least a short-range communication sensor. The first wearable smart device and the second wearable smart device are in communication using respective short-range communication sensors. The second wearable smart device is configured to confirm an electronic financial transaction initiated by the first wearable smart device.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

According to the principles of the example embodiments described herein, a dual wearable smart device system and a method of using the dual wearable smart device system for authenticating an electronic financial transaction are provided. The techniques of the present embodiments provide additional security for a user to authorize electronic financial transactions using wearable devices.

Figure 1:
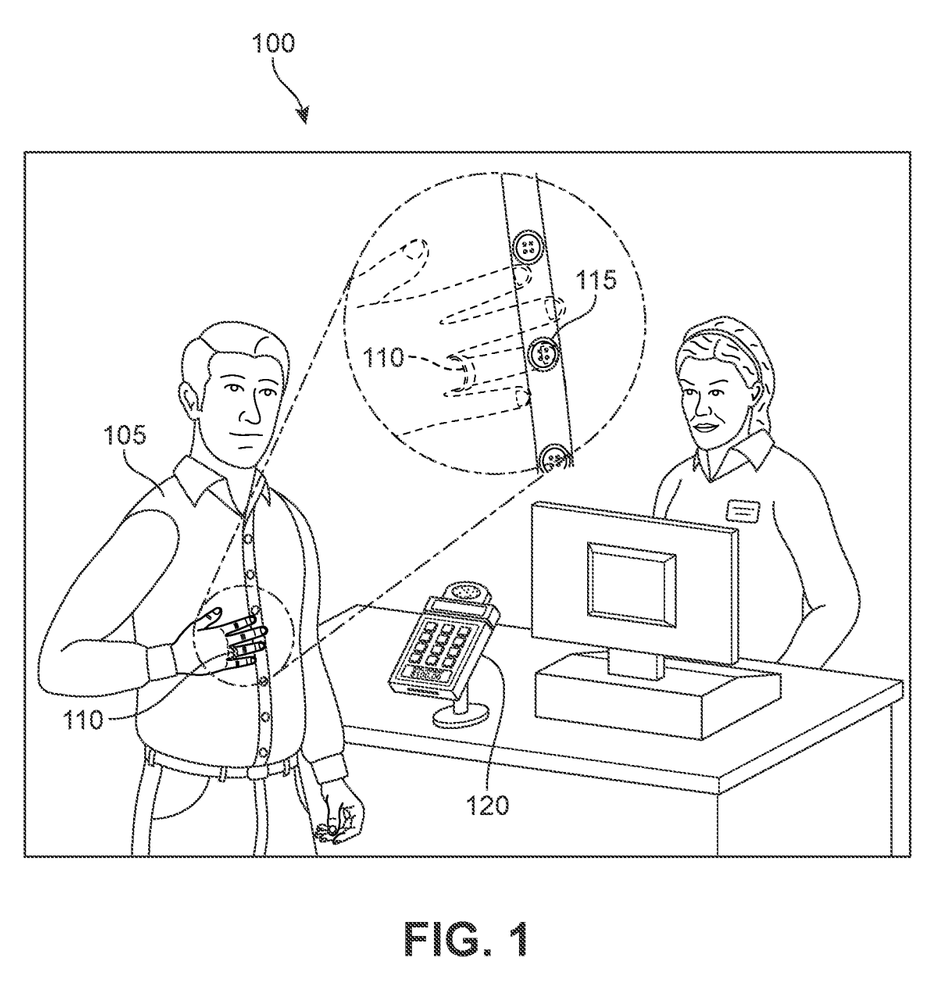
FIG. 1 is a schematic view of an example embodiment of a dual wearable smart device system for authenticating financial transactions.

FIG. 1 illustrates an example embodiment of a dual wearable smart device system 100 for authenticating an electronic financial transaction. In an example embodiment, dual wearable smart device system 100 (also referred to herein as "wearable system 100") includes components configured to enable electronic financial transactions or mobile payments. For example, electronic financial transactions or mobile payments can include purchases made at a merchant using a POS terminal or other payment receiving device, as well as payments between two or more individuals, or other types of transactions that use electronic payment methods to send and/or receive money or credits.

In some embodiments, wearable system 100 includes two or more wearable smart devices worn by a user 105 that may be used together to authenticate and/or authorize an electronic financial transaction. In an example embodiment, wearable system 100 includes a first wearable device 110. In this embodiment, first wearable device 110 is in the form of a smart ring device worn on a finger of a hand of user 105. In an example embodiment, wearable system 100 also includes a second wearable device 115. In this embodiment, second wearable device 115 is in the form of a smart button device integrated into or attached to clothing of user 105. For example, as shown in FIG. 1, smart button device 115 is integrated into a shirt of user 105.

In some embodiments, smart button device 115 may be configured to be attached to the clothing of user 105, such as by stitching or using a pin or similar mechanism. In other embodiments, smart button device 115 may be configured to connect or attach to an existing button on the clothing of user 105, for example, by snapping or fitting over the existing button so that smart button device 115 is removably attached to the clothing of user 105.

In an example embodiment, wearable system 100, including the first wearable device (e.g., smart ring device 110) and the second wearable device (e.g., smart button device 115) is used by user 105 to conduct an electronic financial transaction. In particular, wearable system 100 may be used by user 105 wearing both smart ring device 110 and smart button device 115 to authenticate one wearable device for conducting electronic financial transactions, such as making contactless payments at a POS terminal 120 or similar transactions as described above.

According to the techniques of the example embodiments, one wearable device of wearable system 100 is a payment device that is configured to conduct the contactless payment or other electronic financial transaction with POS terminal 120. The other wearable device of wearable system 100 is a confirmation device that is configured to confirm the identity or security of the payment device of wearable system 100.

For example, in the scenario of the electronic financial transaction shown in FIG. 1, the first wearable device (e.g., smart ring device 110) is the payment device. That is, user 105 may use smart ring device 110 to interact with POS terminal 120 to make payment and conduct the electronic financial transaction. In this embodiment, the second wearable device (e.g., smart button device 115) is the confirmation device that user 105 uses to confirm the electronic financial transaction made by user 105 with the other wearable device, i.e., smart ring device 110. With this arrangement, user 105 may prevent against accidental purchases or theft by using the confirmation device (e.g., smart button device 115) to confirm or authorize the transaction by the payment device (e.g., smart ring device 110).

Additionally, in this embodiment, the confirmation device (e.g., smart button device 115) is discreetly integrated into the clothing of user 105 to further improve security of the transaction. In other embodiments, the confirmation device of wearable system 100 may be similarly discreetly located or otherwise hidden on user 105 so that it is not readily noticeable to others.

Figure 2:
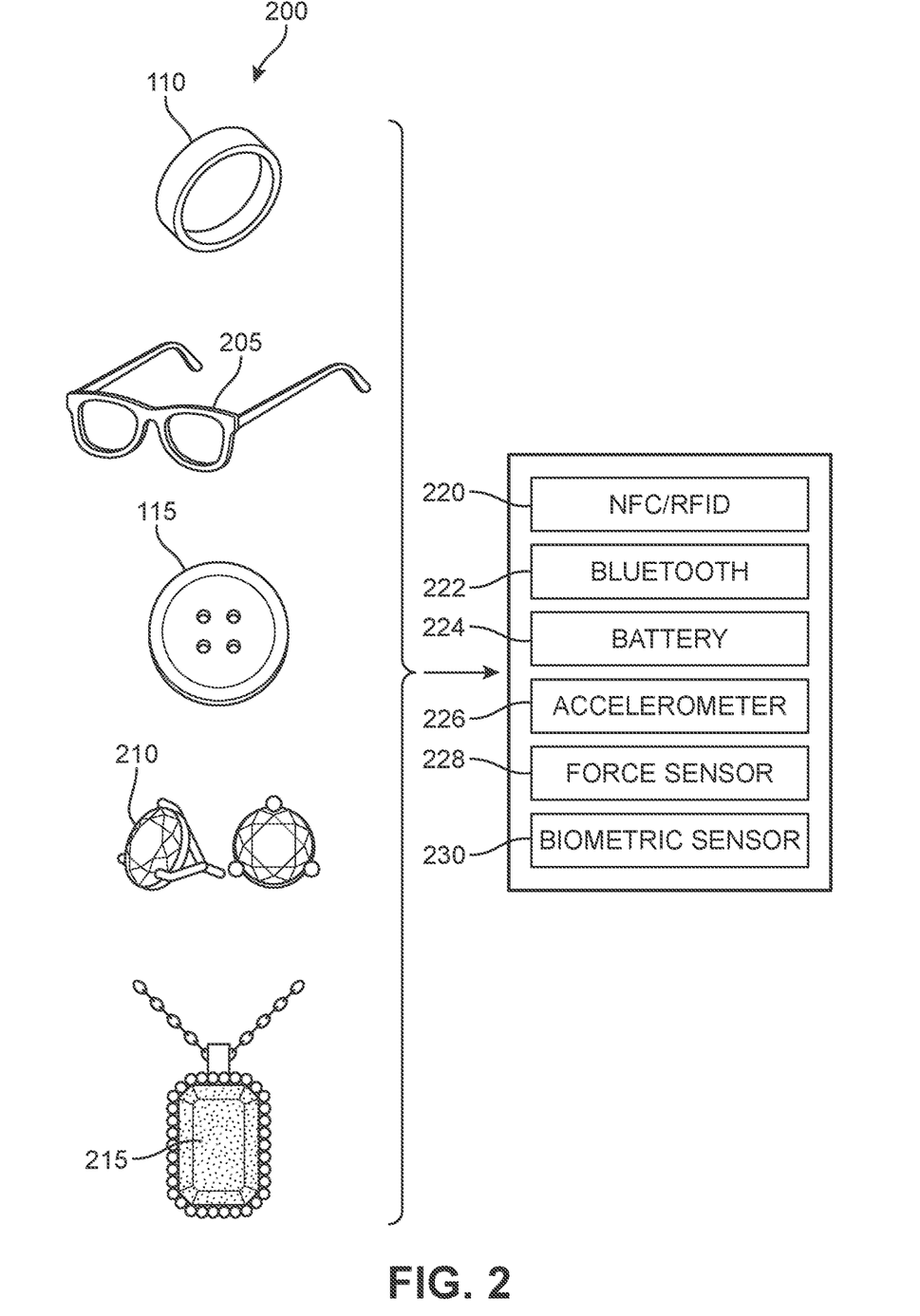
FIG. 2 is a schematic view of example embodiments of wearable smart devices.

The example embodiments of wearable system 100 include two wearable smart devices used together to authorize an electronic financial transaction. In FIG. 1, two examples of wearable smart devices were shown in the form of smart ring device 110 and smart button device 115. In some embodiments, wearable system 100 may include any two or more of a variety of different wearable smart devices. Referring now to FIG. 2, a plurality of wearable smart devices 200 are shown that may be used as part of wearable system 100.

In an example embodiment, plurality of wearable smart devices 200 includes different types or forms of smart devices that may be worn by a user (e.g., user 105) on different parts of the user's body, such as hands, fingers, head, ears, etc., or the user's clothing, such as shirts, pants, shoes, jackets, hats, etc. In this embodiment, plurality of wearable smart devices 200 includes at least smart ring device 110 and smart button device 115, described above, as well as smart eyeglasses 205, smart earrings 210, and smart necklace 215. It should also be understood that other forms of smart wearable devices may be used as part of wearable system 100.

In an example embodiment, each wearable smart device of plurality of wearable smart devices 200 includes a plurality of components that are configured to permit the wearable smart device to communicate with other devices and/or to conduct electronic financial transactions using the wearable smart device. In this embodiment, each wearable smart device of plurality of wearable smart devices 200 includes at least an NFC or Radio Frequency Identification (RFID) sensor 220 that provides the wearable smart device with contactless payment capabilities. The plurality of components of each wearable smart device also includes a Bluetooth sensor 222 or other type of short-range wireless communication sensor, such as a sensor employing WiFi or similar wireless technology, and a battery 224 or other power source that is configured to supply electrical power to the wearable device.

In an example embodiment, the plurality of components of the wearable smart device may also include one or more sensors that are configured to measure parameters associated with movement of the device by the user (e.g., user 105). For example, in this embodiment, the plurality of components of the wearable smart devices include an accelerometer 226 configured to measure acceleration values and a force sensor 228 configured to measure force values. In some embodiments, accelerometer 226 and/or force sensor 228 may be used to measure parameters, such as acceleration, speed, orientation, force, etc., associated with movements of a hand, a finger, or other body part or clothing of a user wearing the smart device.

In some embodiments, a wearable smart device of plurality of wearable smart devices 200 may also include components configured to detect or capture information associated with unique biological traits of a user to identify, verify, and authenticate the user wearing the smart device. In an example embodiment, a wearable smart device of plurality of wearable smart devices 200 includes a biometric sensor 230 that is configured to obtain biometric information associated with a user (e.g., user 105) wearing the smart device. For example, biometric sensor 230 may be a fingerprint sensor, a pulse rate sensor, a vein sensor, an iris sensor, or other type of sensor that is configured to measure or sense biometric information associated with a user wearing the smart device to verify the identity of the user.

Additionally, in some embodiments, the type of biometric sensor 230 included in the wearable smart device may vary depending on the form of the smart device and/or where the wearable smart device is intended to be worn by the user. For example, in an embodiment where the wearable smart device is smart ring device 110, biometric sensor 230 may be located on the inside surface of the ring so that a user's fingerprint is scanned or read by the action of the user putting smart ring device 110 onto their finger. Similarly, smart button device 115 and/or smart earrings 210 may include biometric sensor 230 that is configured to read a fingerprint when a finger of the user is placed onto these devices. In another embodiment, for example, where the wearable smart device is smart eyeglasses 205, biometric sensor 230 may be integrated on or near the lenses of the eyeglasses so that it may scan an iris of the user. In yet another embodiment, for example, where the wearable smart device is smart necklace 215, biometric sensor 230 may be located on a backside of the device to detect or measure a user's pulse or heartbeat.

It should also be understood that not all of the plurality of components (e.g., NFC/RFID sensor 220, Bluetooth sensor 222, battery 224, accelerometer 226, force sensor 228, and biometric sensor 230) may be required in each wearable smart device.

Figure 3:
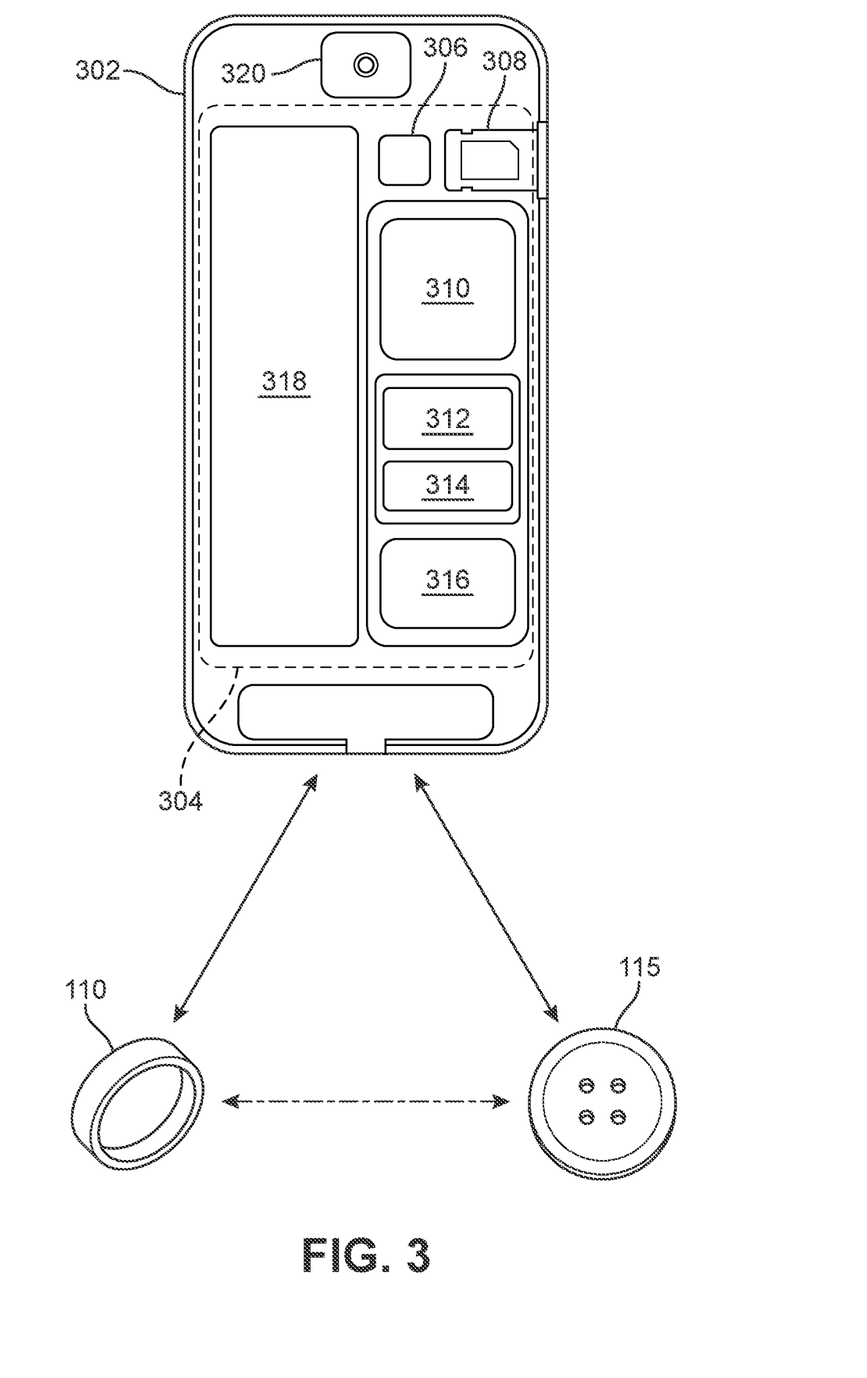
FIG. 3 is a schematic view of an example embodiment of a mobile device used to authenticate wearable devices.

Referring now to FIG. 3, an example embodiment of a mobile device 302 that may be used to authorize the wearable devices of dual wearable device system 100 is shown. In an example embodiment, mobile device 302 is associated with or belongs to the user wearing the two wearable smart devices of wearable device system 100 and is used to authenticate a wearable device to conduct an electronic financial transaction. In particular, mobile device 302 may be used by the user wearing dual wearable device system 100 to authenticate a first wearable smart device as a payment device for conducting electronic financial transactions, such as making contactless payments at a POS terminal or similar transactions as described above, and also to authenticate a second wearable smart device as a confirmation device for confirming the electronic financial transaction by the first wearable smart device (i.e., the payment device).

In this embodiment, mobile device 302 is a cellphone or smart phone. Mobile device 302 includes a plurality of components typically found in a cellphone or smart phone, including, as shown in FIG. 3, at least a display 304, a global positioning system (GPS) sensor 306, a subscriber identity module or subscriber identification module (SIM) 308, a processor 310, a communication module 312 (e.g., for enabling various wireless network communications, such as via code division multiple access (CDMA) and/or global system for mobile communications (GSM) networks, as well as one or more of Bluetooth, WiFi, and/or other wireless communication technologies), a memory 314, a connection module 316 (e.g., to enable wired connections, such as via universal serial bus (USB), Lightning connector, etc.), and a battery 318. In an example embodiment, mobile device 302 may also include at least one camera 320 or other image sensor. It should understood that mobile device 302 and its respective components described above is merely exemplary and any type of suitable mobile device may be used to authenticate the wearable smart devices as described herein. For example, in other embodiments, mobile device 302 may be a tablet or laptop computer.

According to the techniques described herein, mobile device 302 may be used to authorize a first wearable device to conduct electronic financial transactions (i.e., designated as a payment device) and authorize a second wearable device to confirm the electronic financial transactions made by the first wearable device (i.e., designated as a confirmation device). That is, dual wearable device system 100 includes at least two wearable smart devices, with one designated as the payment device that is configured to interact with payment terminals (e.g., POS terminal 120, shown in FIG. 1) and another designated as the confirmation device that confirms the payment made by the payment device.

For example, as shown in FIG. 3, mobile device 302 may be used by a user (e.g., user 105) to authorize smart ring device 110 as the payment device and also to authorize smart button device 115 as the confirmation device. In this embodiment, each wearable smart device (e.g., smart ring device 110 and smart button device 115) communicates with mobile device 302 to authorize the devices and assign their designations as a payment device or a confirmation device. For example, smart ring device 110 and smart button device 115 may communicate with mobile device 302 using any short-range wireless communication technology, such as Bluetooth (via Bluetooth sensor 222 in the wearable smart devices and communication module 312 in mobile device 302), NFC, and/or WiFi.

Once each wearable smart device has been authorized by mobile device 302 and designated as a payment device or a confirmation device, then wearable system 100 may be used by a user to conduct electronic financial transactions. In some embodiments, during the initiation of an electronic financial transaction, the wearable smart device designated as the payment device may directly communicate with the wearable smart device designated as the confirmation device to confirm that the user intends to conduct the electronic financial transaction. For example, as shown in FIG. 3, smart ring device 110 and smart button device 115 may directly communicate with each other device using any short-range wireless communication technology, such as Bluetooth (via Bluetooth sensor 222 in the wearable smart devices), NFC, and/or WiFi. That is, in these embodiments, once mobile device 302 has authorized and designated the wearable smart devices of wearable system 100, mobile device 302 may not be required to provide any further authorizations to conduct the electronic financial transactions.

In other embodiments, mobile device 302 may be used as an intermediary device to facilitate communication between the two wearable smart devices during the initiation of an electronic financial transaction. For example, the wearable smart device designated as the payment device may communicate with mobile device 302 and the wearable smart device designated as the confirmation device may also communicate with mobile device 302 to confirm that the user intends to conduct the electronic financial transaction.

In addition, in another embodiment, mobile device 302 may authorize the electronic financial transaction conducted by the wearable smart device designated as the payment device upon receiving a confirmation from the wearable smart device designated as the confirmation device. That is, in these embodiments, mobile device 302 only authorizes one wearable device for an electronic financial transaction in response to receiving a confirmation from the other. In some embodiments, a user may choose the option of whether or not authorization from mobile device 302 is always required, lasts a predetermined duration or time period (e.g., 30 minutes, 24 hours, 1 week, etc.), or if the initial authorization lasts until the wearable smart devices are de-authorized.

Figure 4:
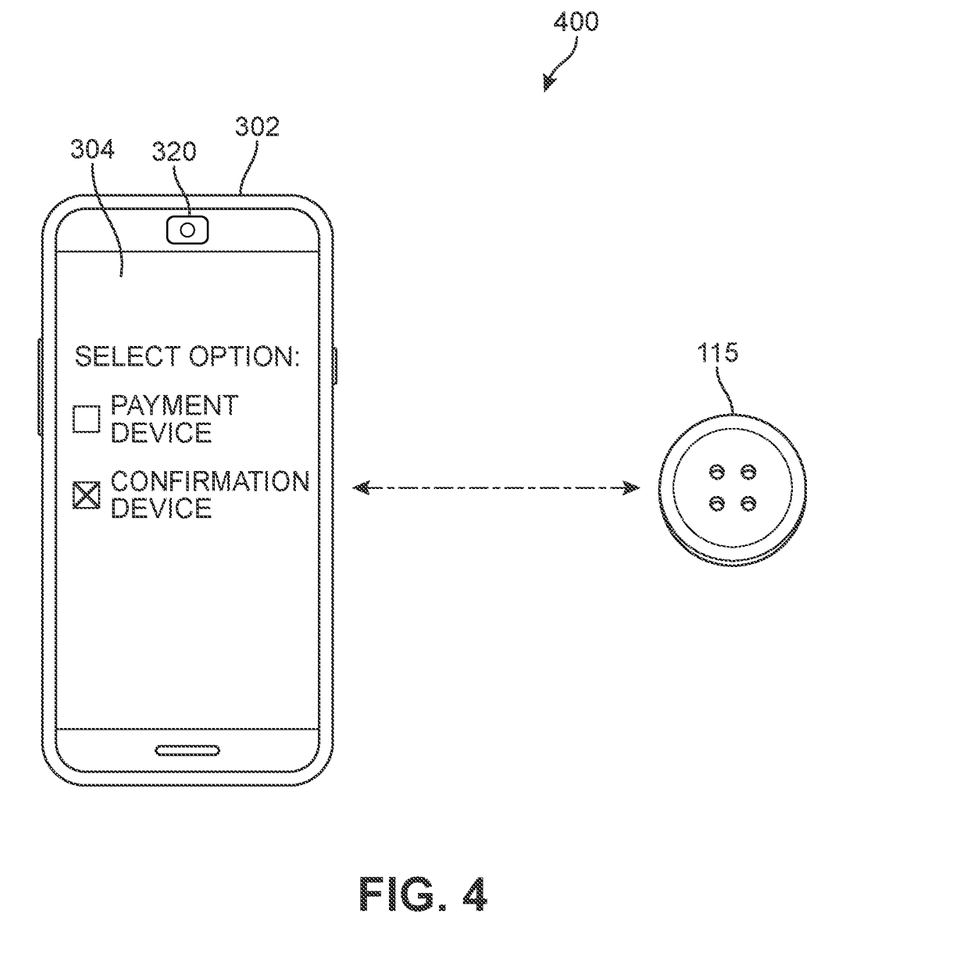
FIG. 4 is a schematic overview of an example embodiment of a process for selecting a type of wearable device for authentication.

Referring now to FIG. 4, an example embodiment of wearable smart button device 115 is shown being authorized as a confirmation device. In an example embodiment, an authentication interaction 400 between smart button device 115 and mobile device 302 is used to select the function of smart button device 115 as a confirmation device for authenticating an electronic financial transaction by a second wearable smart device that functions as the payment device (e.g., smart ring device 110).

In this embodiment, when a user connects a first wearable smart device, smart button device 115, to mobile device 302, the user is presented with an option on display 304 to select the function to be associated with the wearable smart device. For example, in this embodiment, the user may select smart button device 115 to be either a confirmation device (i.e., the wearable smart device that is used to confirm the electronic financial transaction conducted by the payment device) or a payment device (i.e., the wearable smart device that interacts with a payment terminal or other contactless payment technology to conduct the electronic financial transaction).

As shown in FIG. 4, smart button device 115 may be selected to be the confirmation device. In some embodiments, the user may also provide authentication to mobile device 302 as part of authentication interaction 400. For example, the user may enter suitable authentication information, such as, a fingerprint or vein scan received via biometric sensor 230 of the wearable smart device; a password entered via display 304 of mobile device 302; a facial or iris recognition scan obtained via camera 320 of mobile device 302; a password, PIN, pattern, or sequence based code entered via touch screen display 304 of mobile device 302; voice recognition via a microphone of mobile device 302; and/or a gesture-based authentication recognized using one or more sensors of the wearable smart device (e.g., accelerometer 226 and/or force sensor 228) or mobile device 302, as well as any other suitable form of authentication to verify the identity of the user. It should be understood that other forms of authentication may also be provided as part of authentication interaction 400.

Figure 5:
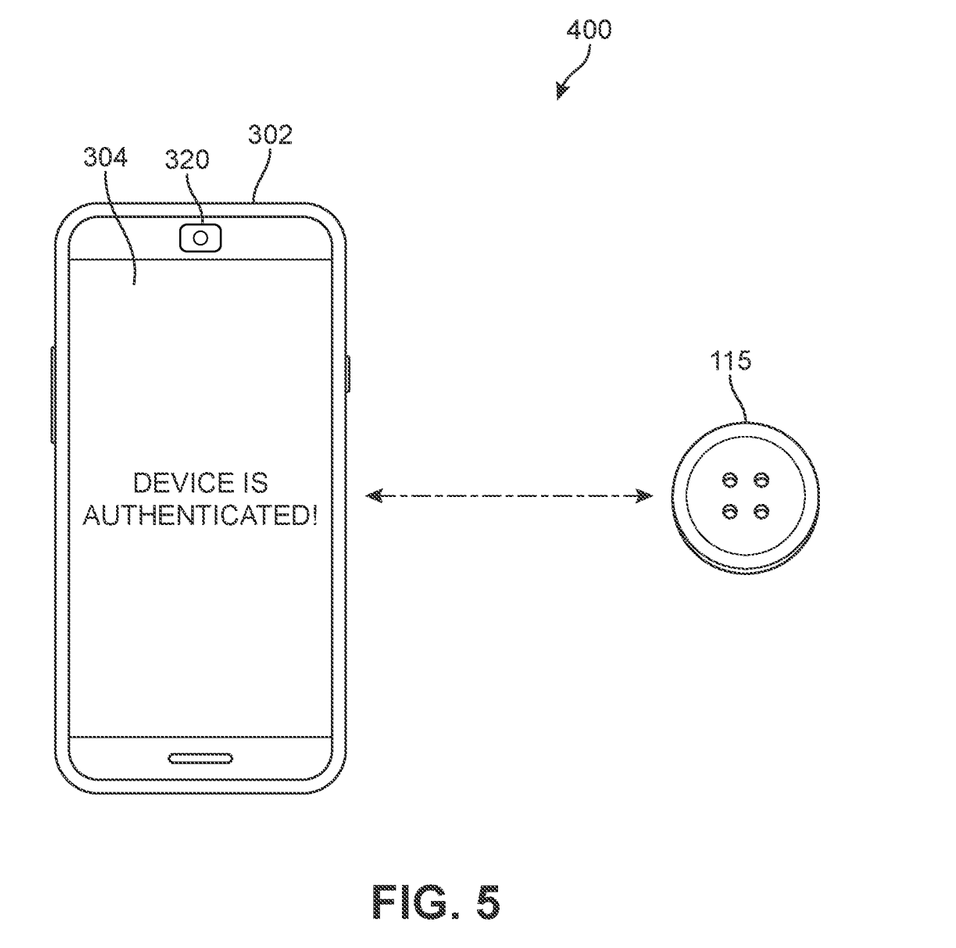
FIG. 5 is a schematic overview of an example embodiment of a process for authenticating a wearable device.

Accordingly, as shown in FIG. 5, once the user has provided the sufficient authentication information for smart button device 115, mobile device 302 authenticates smart button device 115 as being ready for functioning as the confirmation device in wearable device system 100. For example, as shown in FIG. 5, display 304 of mobile device 302 shows a "device is authenticated" message to user to confirm that smart button device 115 has been authenticated as the confirmation device.

In some embodiments, a similar process may be used to authenticate a second wearable smart device, for example, smart ring device 110, as the payment device. In these embodiments, the user may select the option shown on display 304 of FIG. 4 to select the payment device function to be associated with the second wearable smart device (e.g., smart ring device 110). Upon completion of authentication interaction 400 for each wearable smart device, wearable device system 100, including smart ring device 110 and smart button device 115, may be used by the user to conduct one or more electronic financial transactions.

Figure 6:
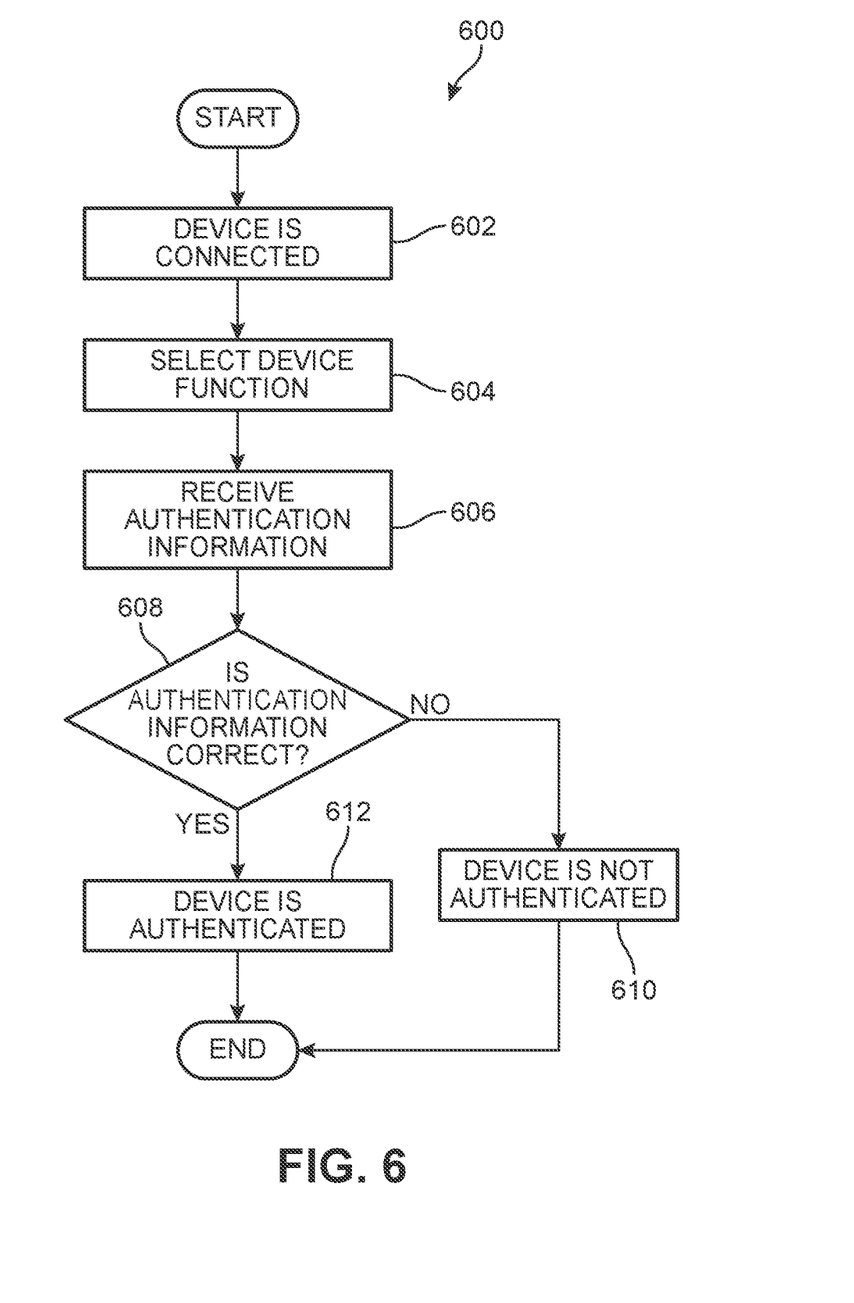
FIG. 6 is a flowchart of an example embodiment of a process for authenticating a wearable device.

Referring now FIG. 6, a flowchart of an example embodiment of an authentication process 600 for authenticating one or more wearable smart devices for use in wearable device system 100 is shown. In some embodiments, authentication process 600 may be performed by mobile device 302 as part of authentication interaction 400, described above. Additionally, in some embodiments, authentication process 600 may also include a preliminary operation where the one or more wearable smart devices are initially paired or connected with a mobile device. For example, the first time a user (e.g., user 105) wears smart ring device 110 and/or smart button device 115, the user may use Bluetooth or another short-range wireless communication technology to pair or connect each wearable smart device (e.g., smart ring device 110 and/or smart button device 115) with mobile device 302. Once the wearable smart devices and mobile device 302 have been initially paired or connected, the devices may automatically pair or connect with each other for subsequent interactions.

In this embodiment, upon initiation of authentication process 600, a wearable smart device (e.g., one of smart ring device 110 or smart button device 115) is worn by a user (e.g., user 105). If the wearable smart device and the user's mobile device (e.g., mobile device 302) have already been paired, as described above, then at an operation 602, the wearable smart device and the mobile device may communicate with each other to establish a connection. For example, via Bluetooth sensor 222 of the wearable smart device and communication module 312 of mobile device 302. If the wearable smart device and the user's mobile device have not already been paired, then upon initiation of operation 602, authentication process 600 may include an additional operation where the smart device and the mobile device are initially paired or connected so that the devices may communicate with each other.

Next, authentication process 600 includes an operation 604. At operation 604, the function of the wearable smart device (i.e., a confirmation device or a payment device) being authenticated is selected. For example, as described above in reference to FIG. 4, smart button device 115 may be selected to function as a confirmation device or a payment device. In this embodiment, smart button device 115 is selected to function as the confirmation device. Similarly, at operation 604, smart ring device 110 may be selected to function as a confirmation device or a payment device. In this embodiment, smart ring device 110 is selected to function as the payment device.

Next, at an operation 606, authentication process 600 includes receiving authentication information for the wearable smart device being authenticated. For example, at operation 606, a user may enter suitable authentication information, such as, a fingerprint or vein scan received via biometric sensor 230 of the wearable smart device, a password entered via display 304 of mobile device 302, a facial or iris recognition scan obtained via camera 320 of mobile device 302, a pattern or sequence based code entered via touch screen display 304 of mobile device 302, voice recognition via a microphone of mobile device 302, and/or a gesture-based authentication recognized using one or more sensors of the wearable smart device (e.g., accelerometer 226 and/or force sensor 228) or mobile device 302, as well as any other suitable form of authentication to verify the identity of the user.

Operation 606 includes comparing the received authentication information to saved or stored authentication information associated with the user (e.g., user 105). In various embodiments, the stored or saved authentication information may be stored or saved on the wearable smart device (e.g., smart ring device 110 and/or smart button device 115), on the mobile device (e.g., mobile device 302), or both. Additionally, the stored or saved authentication information may be appropriately encrypted or protected on the device(s) to prevent unauthorized access or hacking of the stored or saved authentication information.

At an operation 608, whether or not the received authentication information matches the stored or saved authentication information associated with the user is determined. Upon determining at operation 608 that the received authentication information does not match, then authentication process 600 proceeds to an operation 610 where the smart device is not authenticated. Upon failure to authenticate the smart device, authentication process 600 ends.

Upon determining at operation 608 that the received authentication information from operation 606 matches the stored or saved authentication information associated with the user, then authentication process 600 proceeds to an operation 612. At operation 612, the wearable smart device is authenticated and authentication process 600 ends. Upon successful completion of authentication process 600, the user (e.g., user 105) may use the authenticated first wearable smart device (e.g., smart ring device 110) as a payment device to conduct one or more electronic financial transactions and may use the authenticated second wearable smart device (e.g., smart button device 115) as a confirmation device to confirm the electronic financial transactions conducted by the payment device (e.g., smart ring device 110).

According to the techniques described herein, the authenticated confirmation device (e.g., smart button device 115) may be used to authenticate the payment device (e.g., smart ring device 110) for conducting each electronic financial transaction until such time as one or more of the wearable smart devices of wearable device system 100 are de-authorized. In some embodiments, either or both of the wearable smart devices (e.g., smart ring device 110 and/or smart button device 115) may be configured to have their authorization expire or be de-authorized upon expiration of predetermined time period. With this arrangement, secure electronic financial transactions may be conducted using the authenticated first wearable smart device as the payment device and confirmed using the authenticated second wearable smart device as the confirmation device. As a result, electronic financial transactions may not be made using the payment device unless the user specifically confirms the transactions. Accordingly, accidental or unauthorized electronic financial transactions are prevented and avoided.

Figure 7:
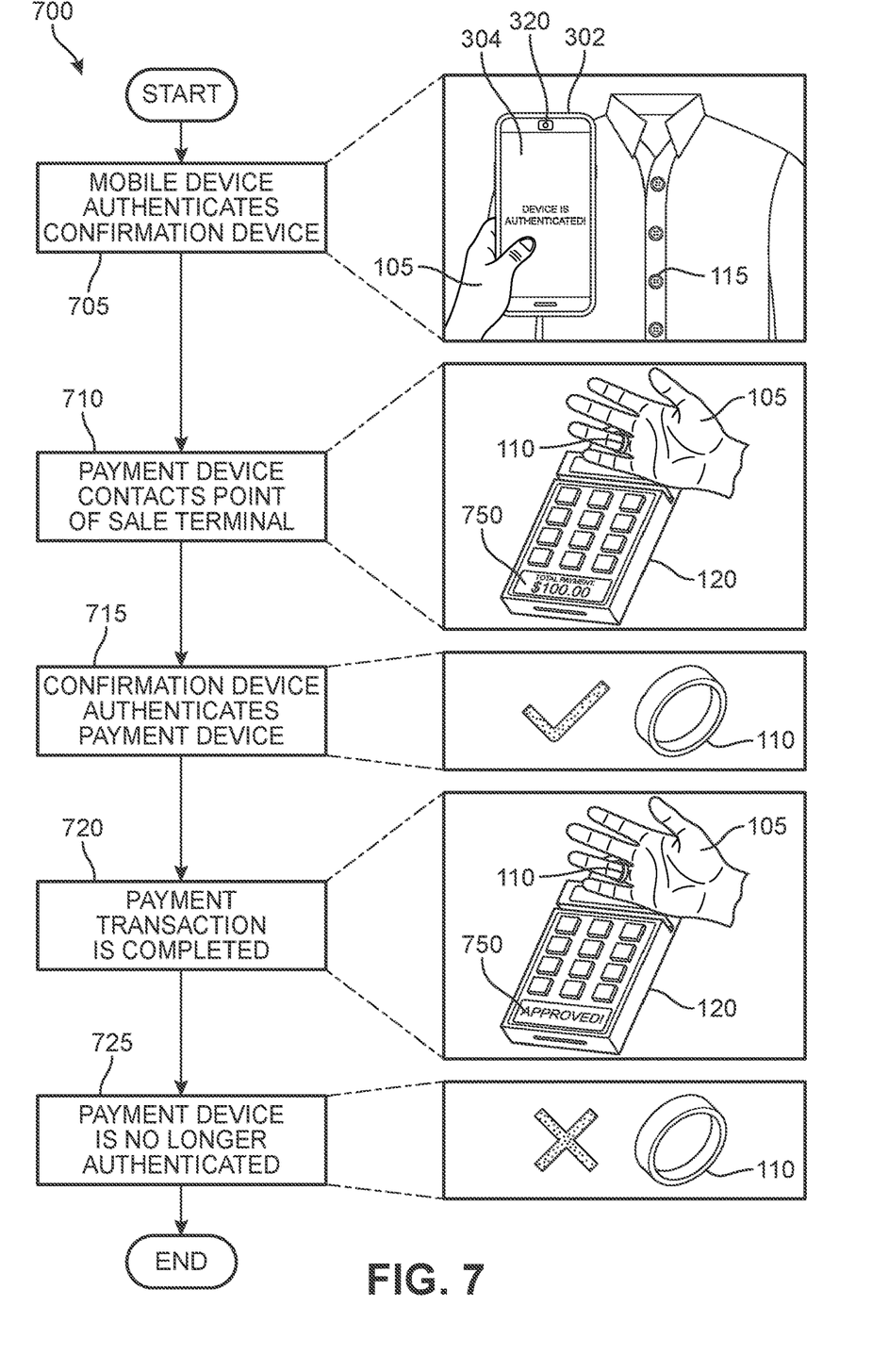
FIG. 7 is a representational flowchart of an example embodiment of a method of conducting a financial transaction using a dual wearable device system.

Referring now to FIG. 7, an example embodiment of a method 700 of conducting an electronic financial transaction using a wearable device system according to the techniques described herein is shown. In an example embodiment, method 700 of conducting an electronic financial transaction may be implemented using wearable device system 100 that includes one wearable smart device that is configured to function as a payment device and another wearable smart device that is configured to function as a confirmation device. In this embodiment, smart ring device 110 is designated as the payment device and smart button device 115 is designated as the confirmation device.

In some embodiments, prior to implementing method 700, a first wearable smart device and a second wearable smart device have already been designated as a payment device and a confirmation device for use with wearable device system 100. For example, authentication of the confirmation device and/or payment device may be implemented as described above in reference to authentication process 600 and/or authentication interaction 400 for each of the first wearable smart device and the second wearable smart device.

In this embodiment, method 700 begins with an operation 705 where a mobile device is used to authenticate the wearable smart device that has been designated to function as a confirmation device. For example, in some embodiments, operation 705 may be implemented by the user (e.g., user 105) on a periodic or limited time basis to re-authenticate the confirmation device (e.g., smart button device 115) for authorizing electronic financial transactions by the payment device (e.g., smart ring device 110).

In other embodiments, such as where a confirmation device and/or a payment device have not already been designated, then operation 705 may include user 105 using mobile device 302 to designate and authenticate smart button device 115 as a confirmation device. In addition, in some embodiments, operation 705 may further include authenticating and designating another wearable device as a payment device. For example, in this embodiment, user 105 can designate and authenticate smart ring device 110 as a payment device using mobile device 302.

Once the confirmation device (e.g., smart button device 115) has been authenticated at operation 705, method 700 proceeds to an operation 710 where the payment device contacts or communicates with a point-of-sale terminal to initiate the electronic financial transaction. For example, user 105 may bring smart ring device 110 in proximity or contact with POS terminal 120 to conduct an electronic financial transaction in the amount of $100 as shown on a display 750 of POS terminal 120.

In this embodiment, POS terminal 120 is provided, for example, by a merchant or business, for receiving payment for goods or services. In one embodiment, POS terminal 120 includes a device reader that is configured to use a wireless signal to conduct the electronic financial transaction with smart ring device 110 worn on a finger of user 105. For example, the device reader of POS terminal 120 may use NFC, RFID, Bluetooth, or other suitable short-range wireless communication technology to conduct the electronic financial transaction with smart ring device 110 of user 105.

In an example embodiment, method 700 includes an operation 715. At operation 715, in response to the initiation of the electronic financial transaction by the payment device, the confirmation device authorizes the payment device to complete the transaction. That is, at operation 715, the confirmation device (e.g., smart button device 115) is used to confirm the electronic financial transaction (e.g., payment of $100 via POS terminal 120) initiated by the payment device (e.g., smart ring device 110).

In some embodiments, the confirmation or authorization by the confirmation device at operation 715 may be triggered or approved by touching the confirmation device (e.g., smart button device 115) by the user (e.g., user 105). In an example embodiment, the confirmation device may include biometric sensor 230, described above, that is configured to read authentication information associated with the user, such as a fingerprint, to confirm the electronic financial transaction by the payment device at operation 715.

Next, upon receiving the confirmation for the electronic financial transaction at operation 715, method 700 proceeds to an operation 720. At operation 720, the electronic financial transaction initiated by the payment device is approved. For example, as shown in FIG. 7, the payment device (e.g., smart ring device 110) has been approved to conduct payment of $100 via POS terminal 120 by the confirmation device (e.g., smart button device 115), as indicated on display 750 of POS terminal 120.

In some embodiments, method 700 may also include an operation 725 where the payment device is no longer authorized or approved to conduct additional electronic financial transactions upon completion of operation 720. That is, method 700 provides for a one-time confirmation or authorization of the payment device by the confirmation device that lasts only for the duration of a single electronic financial transaction. With this arrangement, the user can control when and for how long the wearable smart device that functions as the payment device (e.g., smart ring device 110) remains able to conduct electronic financial transactions. By requiring a second wearable smart device to confirm the transaction initiated by the first wearable smart device, wearable device system 100 provides improved security and safety to the user against unauthorized or accidental electronic financial transactions.

In some embodiments, method 700 may be repeated to conduct additional electronic financial transactions using the same payment device and confirmation device. In other embodiments, method 700 may be newly implemented for a new or different confirmation device and/or payment device. For example, a user may change the function of any one or more of the wearable smart devices associated with wearable device system 100 such that any of plurality of wearable smart devices 200 may be designated as the confirmation device or the payment device. With this arrangement, a user may change which wearable smart device functions as the confirmation device and which wearable smart device functions as the payment device to improve security and safety of the user. Accordingly, the wearable smart devices of wearable device system 100 may remain discreet or hidden from others.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for approving an electronic financial transaction using at least two wearable smart devices, the method comprising:
providing a first wearable smart device that is designated as a payment device for conducting electronic financial transactions;
providing a second wearable smart device that is designated as a confirmation device for confirming the electronic financial transactions by the first wearable smart device;
initiating, by the first wearable smart device, an electronic financial transaction;
approving, by the second wearable smart device, the electronic financial transaction initiated by the first wearable smart device; and
authenticating the first wearable smart device to complete the electronic financial transaction.

2. The method according to claim 1, wherein the first wearable smart device is in communication with the second wearable smart device using a short-range wireless communication technology.

3. The method according to claim 1, wherein the first wearable smart device and the second wearable smart device are in communication with a mobile device using a short-range wireless communication technology.

4. The method according to claim 3, further comprising:
designating the second wearable smart device as the confirmation device using the mobile device.

5. The method according to claim 4, further comprising authenticating the second wearable device as the confirmation device using authentication information associated with a user of the second wearable device received from the mobile device.

6. The method according to claim 5, wherein the authentication information associated with the user includes at least one of a fingerprint scan, a vein scan, a facial recognition scan, an iris recognition scan, a password, a PIN, a pattern or sequence based code, voice recognition, or a gesture-based authentication.

7. The method according to claim 1, wherein the first wearable smart device and the second wearable smart device are physically separated from each other on a user or the user's clothing.

8. The method according to claim 7, wherein the first wearable smart device is configured to be worn on a hand or finger of the user; and
wherein the second wearable smart device is configured to be worn on clothing of the user.

9. A method for conducting an electronic financial transaction using a dual wearable device system, the method comprising:
selecting a first wearable smart device from a plurality of wearable smart devices as a payment device;
selecting a second wearable smart device from the plurality of wearable smart device as a confirmation device, wherein the second wearable smart device is different from the first wearable smart device;
authenticating, by the second wearable smart device, the first wearable smart device for conducting an electronic financial transaction;
using the first wearable smart device to conduct the electronic financial transaction; and
wherein the first wearable smart device is de-authenticated upon completion of the electronic financial transaction.

10. The method according to claim 9, wherein the second wearable smart device includes a biometric sensor; and
wherein authenticating the first wearable smart device includes reading biometric information associated with a user by the second wearable smart device.

11. The method according to claim 9, wherein selecting the second wearable smart device includes using a mobile device to designate the second wearable smart device as the confirmation device.

12. The method according to claim 9, wherein the first wearable smart device is in communication with the second wearable smart device using a short-range wireless communication technology.

13. The method according to claim 9, wherein the first wearable smart device and the second wearable smart device are in communication with a mobile device using a short-range wireless communication technology.

14. The method according to claim 9, further comprising:
changing a selection of at least one of the payment device or the confirmation device to a third wearable smart device.

15. The method according to claim 9, wherein the plurality of wearable smart devices includes two or more smart devices configured to be worn on a user's body or a user's clothing.

16. A dual wearable device system for conducting an electronic financial transaction, the system comprising:
a first wearable smart device including a short-range communication sensor and at least one of a near-field communication (NFC) sensor or a radio frequency identification (RFID) sensor;
a second wearable smart device including at least a short-range communication sensor;

wherein the first wearable smart device and the second wearable smart device are in communication using respective short-range communication sensors; and wherein the second wearable smart device is configured to confirm an electronic financial transaction initiated by the first wearable smart device.

17. The system according to claim 16, further comprising:

a mobile device including a communication module configured to permit the mobile device to communicate with the short-range communication sensor of the first wearable smart device and/or the short-range communication sensor of the second wearable smart device;

wherein the mobile device is configured to receive authentication information associated with a user of the dual wearable device system to authenticate the second wearable smart device to be a confirmation device for confirming the electronic financial transaction initiated by the first wearable smart device.

18. The system according to claim 16, wherein authentication information associated with a user is received by the second wearable smart device to confirm the electronic financial transaction initiated by the first wearable smart device.

19. The system according to claim 18, wherein the second wearable smart device includes a biometric sensor; and wherein the authentication information associated with the user is biometric information received from the biometric sensor of the second wearable smart device.

20. The system according to claim 16, wherein the first wearable smart device and the second wearable smart device are physically separated from each other on a user or the user's clothing.

\* \* \* \* \*